(12) United States Patent
Thornberg

(10) Patent No.: US 6,777,019 B1
(45) Date of Patent: Aug. 17, 2004

(54) METHOD FOR PREPARING A LIVESTOCK FEED SUPPLEMENT BLOCK

(75) Inventor: Robert Thornberg, Walhalla, ND (US)

(73) Assignee: Harvest Fuel, Inc., Walhalla, ND (US)

(*) Notice: Subject to any disclaimer, the term of this patent is extended or adjusted under 35 U.S.C. 154(b) by 387 days.

(21) Appl. No.: 09/950,246

(22) Filed: Sep. 10, 2001

Related U.S. Application Data (63) Continuation of application No. 09/244,871, filed on Feb. 5, 1999, now abandoned.

(51) Int. Cl.[7] .............. A23K 1/06; A23K 1/18; A23K 1/20
(52) U.S. Cl. .............. 426/623; 426/512; 426/624; 426/630; 426/635; 426/807
(58) Field of Search .............. 426/512, 623, 426/624, 630, 635, 807

(56) References Cited

U.S. PATENT DOCUMENTS

| | | |
|---|---|---|
| 340,553 A | 4/1886 | Cannon |
| 669,462 A | 3/1901 | Krepps |
| 1,020,091 A | 3/1912 | Greenbaum |
| 2,222,306 A | 11/1940 | Atwood |
| 2,263,608 A | 11/1941 | Brown |
| 2,658,476 A | 11/1953 | Futter |
| 2,685,398 A | 8/1954 | King |
| 2,833,247 A | 5/1958 | Beyea |
| 3,031,207 A | 4/1962 | Bard |
| 3,035,623 A | 5/1962 | Goetz |
| 3,055,529 A | 9/1962 | Cameron et al. |
| 3,164,252 A | 1/1965 | Hosbien |
| 3,279,640 A | 10/1966 | Dodson |
| 3,348,722 A | 10/1967 | Trevarrow, Jr. |
| 3,521,777 A | 7/1970 | Vik |
| 3,602,368 A | 8/1971 | Gould |
| 3,804,289 A | 4/1974 | Churan |

(List continued on next page.)

FOREIGN PATENT DOCUMENTS

| | | |
|---|---|---|
| FR | 1117219 | 5/1956 |
| GB | 1495012 | 12/1977 |

OTHER PUBLICATIONS

Miller's Catalog; p. 106–Stubbs Stable Equipment Advertisement for #9701 Manure basket–#9706 Jr. Keeneland Feeder, (Hobe Equipment Catalogs Box).

John, et al., "Processign of biodegradable blends of wheat gluten and modified polycaprolactone". Polymer 39:2883–2895 vol. 39 (1998).

Primary Examiner—Arthur L. Corbin
(74) Attorney, Agent, or Firm—Fredrikson & Byron P.A.

(57) ABSTRACT

A livestock feed supplement block including a molded base and a livestock feed supplement composition compressed into and extending upwardly from the base. The molded base includes a generally cylindrical wall having a radially inwardly extending annular shelf, and a generally circular floor that is integrally formed with the wall to define an upwardly open interior cavity. The floor of the base is configured and arranged to define a downwardly open channel, the opposite ends of the channel being defined by a pair of downwardly open notches in the wall, the channel having a center line disposed away from the center of the generally circular floor. A plurality of upwardly extending pins are located at intervals along the annular shelf of the wall. The livestock feed supplement composition has an upper end and a generally cylindrical outer surface, and the distance between the upper end of the feed supplement composition and the lower end of the cylindrical wall is at least about twice the distance between the upper and lower ends of the wall of the base.

9 Claims, 4 Drawing Sheets

U.S. PATENT DOCUMENTS

| | | |
|---|---|---|
| 3,812,995 A | 5/1974 | Lewis |
| 3,844,427 A | 10/1974 | Miles-Luscombe et al. |
| 3,942,670 A | 3/1976 | Mingus et al. |
| 3,949,877 A | 4/1976 | Santoni |
| 4,007,694 A | 2/1977 | Fowler et al. |
| 4,014,452 A | 3/1977 | Galer |
| 4,016,296 A | 4/1977 | DeSantis |
| 4,027,043 A | 5/1977 | Schroeder et al. |
| 4,160,041 A | 7/1979 | Schroeder et al. |
| 4,171,385 A | 10/1979 | Skoch et al. |
| 4,171,386 A | 10/1979 | Skoch et al. |
| 4,221,818 A | 9/1980 | Schroeder |
| 4,234,608 A | 11/1980 | Linehan |
| 4,257,527 A | 3/1981 | Snyder et al. |
| 4,286,723 A | 9/1981 | Schutz |
| 4,349,578 A | 9/1982 | Wright et al. |
| 4,431,675 A | 2/1984 | Schroeder et al. |
| 4,437,432 A | 3/1984 | Immeyer et al. |
| 4,560,561 A | 12/1985 | Henderson et al. |
| 4,631,192 A | 12/1986 | Mommer et al. |
| 4,664,260 A | 5/1987 | Stokes |
| 4,729,896 A | 3/1988 | Sawhill |
| 4,731,249 A | 3/1988 | Findley |
| 4,735,809 A | 4/1988 | Donovan et al. |
| 4,798,727 A | 1/1989 | Miller |
| 4,800,088 A | 1/1989 | Sawhill |
| 4,904,486 A | 2/1990 | Donovan et al. |
| 4,928,839 A | 5/1990 | Kruelskie |
| 5,006,357 A | 4/1991 | Bert |
| 5,044,502 A | 9/1991 | Hale |
| 5,048,679 A | 9/1991 | Thomas |
| 5,071,028 A | 12/1991 | Murphy |
| 5,105,947 A | 4/1992 | Wise |
| 5,226,558 A | 7/1993 | Whitney et al. |
| 5,260,089 A | 11/1993 | Thornberg |
| 5,332,099 A | 7/1994 | Thornberg |
| D352,136 S | 11/1994 | Thornberg |
| 5,466,115 A | 11/1995 | Thornberg |
| 5,622,739 A | 4/1997 | Benton et al. |
| 5,665,152 A | 9/1997 | Bassi et al. |
| 5,709,894 A | 1/1998 | Julien |
| 5,747,648 A | 5/1998 | Bassi et al. |
| D440,362 S | 4/2001 | Thornberg |

METHOD FOR PREPARING A LIVESTOCK FEED SUPPLEMENT BLOCK

This application is a continuation of, commonly assigned patent application entitled: LIVESTOCK FEED SUPPLEMENT BLOCK, Ser. No. 09/244,871, filed on Feb. 5, 1999 now abandoned.

TECHNICAL FIELD

The present invention relates to livestock feed supplements, and particularly to a livestock feed supplement block having a molded base with a feed supplement composition compressed into the base.

BACKGROUND OF THE INVENTION

Cattle and other commercially raised livestock are often provided with "salt licks" or "protein and energy lick blocks" as a dietary feed supplement to assure that the livestock receive sufficient nutrients in their diet, including protein, vitamins and minerals. Such supplements are often fed either in block form, allowing the livestock to feed on a free-choice basis, or mixed into livestock feed in predetermined portions. When free-choice feeding blocks are used, the amount of such supplement consumed by livestock can generally be controlled by regulating the hardness and palatability of the blocks.

These lick blocks are commonly produced as heavy blocks that are generally cubic in shape and tend to be unwieldy and difficult to handle. Such "square" blocks can weigh, e.g., up to approximately 50 pounds. When provided in a larger, "barrel" shape, these lick blocks can weigh up to, for example, 250 pounds. In use, the lick blocks are usually placed about the area in which the cattle are being raised, and they generally include a number of vitamins, minerals or other nutrients.

U.S. Pat. No. 5,260,089 (which is commonly owned by the owner of the present invention) describes a highly palatable feed stock supplement providing high by-pass protein (i.e., protein that can be directly absorbed in the animal's intestine without having to be metabolized in a ruminant animal's stomach) without using molasses or urea. The supplement is formulated using byproducts of grain alcohol fermentation and standard amounts of other nutritional supplements, including vitamins and minerals. The supplement may be formed into a relatively hard barrel-type block for free-choice feeding or it may be mixed into livestock feed in granular form.

Handling of lick blocks can be quite difficult, given the substantial weight and bulky shape of many of the blocks currently produced. As a result, containers have been developed to assist in transporting and delivering the lick blocks to the site of use. U.S. Pat. No. 5,332,099 (also commonly owned by the owner of the present invention) provides a barrel-type container for storing, transporting and handling lick-block material. The container includes a generally cylindrical wall and generally circular floor. The floor and wall meet to define a curved bottom edge of the container. The floor of the container includes a channel having a center line disposed away from the center of the floor. The channel is sized and positioned on the floor such that when two containers are positioned adjacent each other in side-by-side abutment with the channels positioned generally parallel to one another, the channels are adapted to receive a standard-sized forklift fork.

Various current animal feed supplements provided in block form have been described. U.S. Pat. No. 4,221,818 describes an animal feed supplement in block form that comprises a composition of a sugar solution and a solidifying component together with optional amounts of animal nutrients. The feed supplement is solidified and provided in a cardboard carton with a plurality of vertical cardboard partitions incorporated therein. Another animal feed supplement block configuration is described in U.S. Pat. No. 4,731,249. This configuration involves pouring a chemically hardening feed supplement mixture into a mold lined with a bag formed of a water soluble plastic. The top edges of the plastic bag are folded against the surface of the liquid mixture in the mold, and an adhesively backed label can be applied over the folded edges. The mold is stripped after the supplement mixture has solidified into a block.

Although the barrel-type container of the '099 patent has met with considerable commercial success, Applicant has found that there exists a need for improved feed supplement blocks. For example, after the livestock have consumed a feed supplement composition, the user must either dispose of the barrel-type container, or he or she must return the container to the manufacturer for reuse. If the container is to be reused, it must be returned to the site of manufacture, washed, disinfected and re-filled with feed supplement composition. This procedure entails significant costs, including freight, handling, labor and storage costs. The costs of transporting and/or storing empty containers are not insignificant, adding to the overall production costs of the feed block. Additionally, it is desirable to reduce the bulk and weight of the container used to transport the feed block composition, thereby reducing overall delivery costs.

SUMMARY OF THE INVENTION

The present invention provides a livestock feed supplement block comprising a molded base and a livestock feed supplement composition compressed into the base and extending vertically upwardly out from the base. The molded base includes a generally cylindrical wall having upper and lower ends, the cylindrical wall preferably having a radially inwardly extending annular shelf, and a generally circular floor. The floor of the base is integrally formed with the wall to define an upwardly open interior cavity and is configured and arranged to define a downwardly open channel. The opposite ends of the channel are defined by a pair of downwardly open notches in the wall, and the channel has a center line disposed away from the center of the generally circular floor. The livestock feed supplement composition of the present invention is compressed into the base and has an upper end and a generally cylindrical outer surface extending down to meet the upper end of the base's cylindrical wall. The height of the side-wall surface is at least about twice the distance between the upper and lower ends of the wall of the base.

In a particularly preferred embodiment, the molded base is fabricated of a biodegradable material, such that once the feed supplement composition has been consumed by livestock, the base does not have to be removed from the site of use. Rather, the base can remain in the field and allowed to degrade naturally. This eliminates the need to dispose of the base or store and reuse the base in another application.

In a particularly preferred embodiment, the livestock feed supplement composition is provided in a form such that it consists essentially of dried grains, selected nutritional supplements, and a moisture laden component such as condensed distillers solubles, corn steep liquor, or the like. This formulation of the feed supplement composition is sufficiently rigid when cured to be generally self-supporting during transportation and use, without the need for exterior walls extending up the entire height of the livestock feed block In another aspect, the present invention provides a method of preparing a livestock feed supplement block. The method includes the step of providing a molded base that includes a generally cylindrical wall having upper and lower ends, the cylindrical wall preferably having a radially inwardly extending annular shelf, and a generally circular floor that is integrally formed with the wall to define an upwardly open interior cavity, the floor being configured and arranged to define a downwardly open channel. The opposite ends of the channel are defined by a pair of downwardly open notches in the wall, the channel having a center line disposed away from the center of the generally circular floor. A mold is provided that is upwardly and downwardly open, the mold being defined by a generally cylindrical wall having a bottom edge. The molded base is aligned adjacent to the bottom edge of the cylindrical mold wall, and a flowable granular livestock feed supplement composition is poured into the mold. The livestock feed supplement composition is compressed into the base within the mold to form a feed supplement block. The compressed feed supplement block, including its base, is then removed from the mold. The method of the present invention significantly reduces the time required for curing the feed supplement composition prior to transportation and use, since the side walls of the feed supplement composition are exposed to circulating air. This reduces the overall production time required to prepare the feed supplement block, and provides a cost effective method of providing the feed supplement.

In these aspects, the present invention provides a livestock feed supplement block including a molded base and livestock feed supplement composition compressed into the base. Thus, there is provided a cost-effective livestock feed supplement block that can be easily transported to the site of use. The present invention is readily used with a standard forklift, and its configuration allows it to be rolled on its side during manual handling. Further, the molded base and feed supplement composition are fabricated such that the overall bulk of the feed block is reduced. When emptied, the molded bases can be easily stacked so that an individual base is "nested" within another molded base. This nesting significantly reduces the amount of space required for shipping and storing the empty base, particularly in comparison to prior art barrels. In a particularly preferred embodiment, the base of the present invention can be fabricated from a biodegradable composition, eliminating the need to dispose or store materials after the feed block composition itself has been consumed.

DETAILED DESCRIPTION

The drawings illustrate a preferred embodiment of the present invention, generally indicated by reference numeral 20. The present invention provides a livestock feed supplement block 20 which includes a molded base 22 and a livestock feed supplement composition 24 that is compressed into the base. As shown in the figures, a preferred embodiment of the present invention provides a molded base 22 which includes a generally cylindrical wall 26 preferably having an annular shelf 28, a generally circular floor 30, and an open channel 32 within the floor. Optionally, the base 22 further includes a plurality of upwardly extending pins 34 located at intervals along the annular shelf 28.

In a preferred embodiment, as depicted in the figures, the molded base 22 is provided as a unitary structure. The unitary structure of the molded base eliminates the need for such fastening means as nails, staples, bolts or welding to secure individual components of the base to each other. As a result, the base 22 is durable and capable of supporting heavy loads of such material as livestock feed supplement compositions. The molded base 22 can be fabricated using any suitable method, such as, for example, injection molding.

The molded base 22 can be fabricated from any suitable material that provides such desired characteristics as durability, ability to be molded into a desired configuration, and strength. Examples of suitable materials include polymers (such as, for example, high density polyethylene) or biodegradable compositions. Optionally, additives can be utilized to provide such characteristics as improved strength or durability.

Suitable biodegradable compositions include, for example, natural polymers (e.g., wheat gluten and starch) and aliphatic polyesters (e.g., polycaprolactone (PCL), polylactic acid (PLA) and copolymers of poly(hydroxybuyrate-covalerate (PHBV)). These biopolymers can be thermoplastic (e.g., consisting primarily of plasticizer) or thermoset (e.g., consisting primarily of biopolymers). Examples of suitable biodegradable materials are discussed in *Processing of Biodegradable Blends of Wheat Gluten and Modified Polycaprolactone*, Polymer 39:13, 2883–2895 (1998); U.S. Pat. No. 5,747,648; and U.S. Pat. No. 5,665,152 (the contents of each of these references is hereby incorporated by reference). If desired, additives may be included to provide additional preferred characteristics, e.g., in the form of elasticizers or plasticizers.

Preferably, suitable biopolymers are degradable by the elements (e.g., ultraviolet light and rain) and/or livestock consumption. Thus, the biodegradable compositions provide several advantages for the livestock feed supplement block of the present invention. In use, the livestock feed supplement block 20 is provided to the user in the form of a molded base 22 containing a livestock feed supplement composition 24. In its initial form, therefore, the livestock feed supplement composition 24 provides at least a partial shield for the base 22 against such elements as ultraviolet light and rain. However, as the livestock consume the feed supplement composition, the base 22 becomes more directly exposed to the elements, allowing the base 22 to begin degrading. Thus, the base 22 of the present invention provides a stable container for the feed supplement composition 24 for a period of time sufficient to allow livestock to access the needed nutrients. At the same time, the base 22 degrades after the feed supplement composition has been consumed, in a sufficient amount of time such that the user does not have to remove the base 22 after the feed supplement composition is gone. Thus, the base 22 can be positioned in a field and left, and the user does not have to be concerned about further maintenance (e.g., breaking down and/or storing) or disposal of the base.

As indicated above, the molded base 22 includes a generally circular floor 30 that is integrally formed with a generally cylindrical wall 26. The floor 30 and wall 26 form a unitary molded base structure defining an upwardly interior cavity, and the floor 30 provides the supporting surface for material contained within the interior cavity. The present invention can be adapted to contain any material; however, the invention has particular utility in containing and delivering feed or feed supplement material for livestock.

The floor 30 preferably has a channel 32 formed therein. The channel may be of any desired shape, but preferably is generally C-shaped, as shown in the drawings, and is sized to comfortably receive a fork of a conventionally-sized forklift. As the standard fork is generally about four inches wide, the channel is designed to be at least that wide and may extend up to about eight inches wide. The channel extends generally upwardly from the floor and into the interior cavity 46, defining notches 40 in the wall 26 adjacent the lower end thereof Thus, one notch 40 is disposed on each end of the channel 32 where the channel passes through the wall.

The center line L of the channel 32 desirably is spaced away from the center of the floor 30, i.e., the axis A of the generally cylindrical wall 26. The channel's center line L therefore does not define a diameter of the floor, but rather describes a shorter chord which extends through a narrower portion of the floor. As shown the figures, this effectively divides the floor 30 into two unequally sized first and second arcuate sections, 42 and 44, respectively.

The distance from the channel 32 to the farthest point on the periphery of the first arcuate section 42 is desirably approximately one-half the distance between the tines on a fork of a conventional forklift. The second arcuate section 44 will comprise the remainder of the floor, excluding the first arcuate section 42 and the width of the channel 32. Because the dimensions of the forklift are fixed, the size of this second section will depend almost entirely on the size and geometry chosen for the molded base 22.

It is contemplated that the second section 44 will generally range between about one-third and about three-quarters the size of the first section 42. However, one of skill in the art would readily understand that the size of the smaller section can be varied quite widely. The channel could be positioned immediately adjacent the outer edge of the floor such that the smaller section is eliminated entirely if a smaller floor is used; conversely, if a much larger floor is used, the second section 44 may be larger in size than the first section 42. The constant in this determination is the preference to have the distance from the channel to the furthermost part of the first section 42 be approximately one-half the distance between the forks of a forklift, as mentioned above.

The distance from the channel to the furthermost part of the first section 42 is important for the use of the present invention in connection with a forklift. It is contemplated that a plurality of feed blocks according to the invention will be provided and that at least two, and preferably four, such feed blocks will be secured to one another in side-by-side abutment. The channels 32 of the bases 22 should be generally parallel to one another and the first sections 42 should be disposed adjacent one another. Because the width of the first section 42 of the molded base is approximately one-half the distance between the forks of a forklift, when the feed blocks are so positioned the channels 32 are positioned to receive the forks.

Optionally, the floor 30 can be configured to include a second channel 33 formed therein. The second channel 33 is desirably positioned at the periphery of the first arcuate section 42. The second channel 33 runs in parallel to channel 32 through the floor 30, so that the two channels do not intersect. The second channel 33 extends generally upwardly from the floor and into the interior of the cavity 46, forming a ledge in the wall 26. The size and shape of the channel 33 can be varied, and preferably the channel is sized to receive the tines of a hand dolly commonly used in feed mills. As the tines of a standard hand dolly are generally approximately 3 inches wide, the channel is designed to be at least that wide. The channel 33 thus serves an important function when the present invention is intended to be used with a standard hand dolly used in feed mills. In use, a hand dolly is used to carry at least one, and possibly two, livestock feed supplement blocks at a time. When used with a hand dolly, one tine of the hand dolly will be received in the first channel 32, while the second tine will be received in the second channel 33.

As indicated above, the floor 30 is integrally formed with a generally cylindrical wall 22 to define an upwardly open interior cavity 46. The floor 30 and wall 22 can be configured to converge at a sharp angle (e.g., an angle of approximately 90 degrees). However, in a preferred embodiment depicted in the figures, the lower end of the cylindrical wall meets the periphery of the circular floor to define a curved edge 48 of the molded base 22. This curved edge is desirably configured such that it contains a slope sufficient to render the feed supplement block 20 easily transportable. The curvature of the curved edge 48 of the molded base 22 assists the user to tip the livestock feed supplement block during transportation and delivery of the block to the site of use. Thus, the design of the instant invention provides a stable feed block which can be approached and used by livestock but is still easier to tip over when so desired by tipping the feed block adjacent a notch 40 in the wall 26, or adjacent the ledge formed by the second channel 33.

It has been found particularly usefull to tip over a livestock feed supplement block 20 in order to permit manual handling of the block. When the block is on its side, it may be rolled fairly readily from one location to another rather than having to be physically carried from place to place. Once the feed block has reached the desired location, it can then be returned to its upright position. Generally, a feed block of the present invention can weigh up to about 250 pounds or more when provided with a feed supplement composition within the molded base. Manually carrying the lick block is virtually impossible for an ordinary user (without a hand dolly, forklift or other implement), and the ability to roll the lick block is therefore quite helpful.

A channel formed in the generally cylindrical wall defines a notch 40 therein, interrupting the curvature of that wall. The channel effectively defines a short chord C adjacent the periphery of that wall. The dimensions of a channel adapted to receive the fork of a forklift are effectively predetermined in that they must safely receive the fork. Since the width of the channel is effectively fixed, the length of the chord C will vary only with the curvature of the wall adjacent the channel—the greater the curvature, the greater of an interruption in curvature the channel will represent. This produces a chord C which is longer and is closer to the center of the circle than the radius of the circular wall.

The wall 26 preferably includes an annular shelf 28 that extends continuously around the circumference of the base 22. The annular shelf 28 can be provided at any desirable vertical position on the wall 26. In a preferred embodiment, as depicted in the figures, the annular shelf 28 is positioned on the wall 26 at a height above the uppermost point of the channels 32 and 33. The annular shelf 28 extends radially inwardly from the cylindrical wall 26 and can be provided at a perpendicular angle to the wall 26. However, in a particularly preferred embodiment, the annular shelf 28 contains a downward slope in the direction away from the wall 26 and towards the center of the molded base 22.

The annular shelf 28 is particularly useful when manually handling feed blocks with a standard forklift. The tines of a standard forklift can be used in connection with the annular shelf to allow the user to move individual feed blocks without using the channel 32 of base 22. The channel 32 is not a practical way to move an individual feed block, since the center line of the channel 32 is desirably spaced from the center of the floor 30, and the channel effectively divides the floor 30 into two unequally sized first and second arcuate sections, 42 and 44. Therefore, a standard forklift inserted within the channel 32 of an individual feed block would not be capable of balancing an individual feed block, since the center of gravity of the feed block would cause it to roll off the fork. Therefore, the present invention contemplates using a standard forklift in connection with the annular shelf 28 to move individual feed blocks. In use, the annular shelf 28 is adapted to receive the tines of the forklift; thus, the annular shelf 28 projects a sufficient distance from the base 22 to allow the tines of a forklift to support and lift the base 22. Alternatively, one or two feed blocks can be manually handled using a hand dolly, as discussed above.

Figures 1, 2, 3:
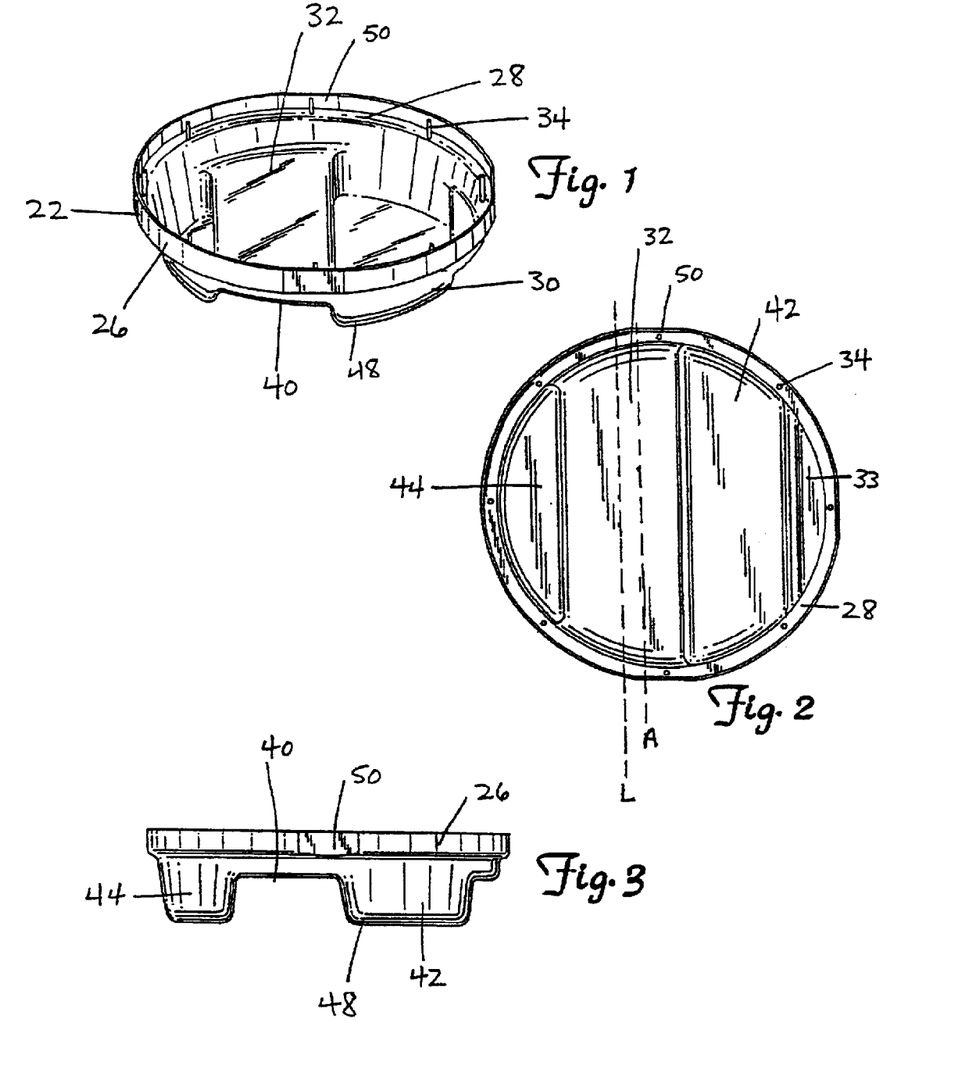
FIG. 1 is a perspective view of a preferred embodiment of a livestock feed supplement base of the present invention.
FIG. 2 is a top view of the livestock feed supplement base of FIG. 1.
FIG. 3 is a front side view of the livestock feed supplement base of FIG. 1.
Figure 4:
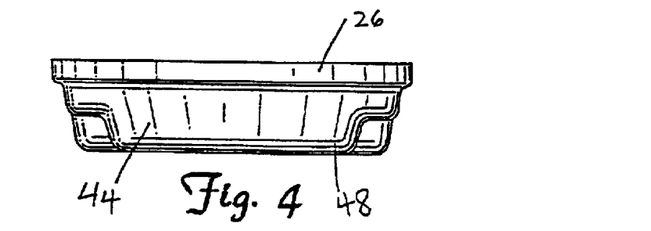
FIG. 4 is a left side view of the livestock feed supplement base of FIG. 1.
Figure 5:
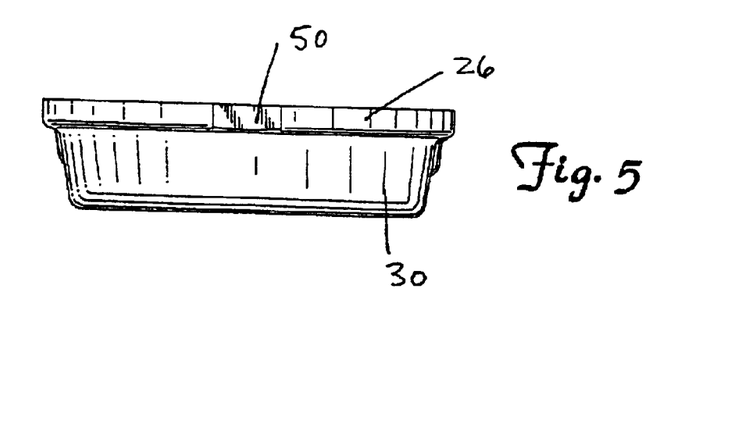
FIG. 5 is a right side view of the livestock feed supplement base of FIG. 1.
Figure 6:
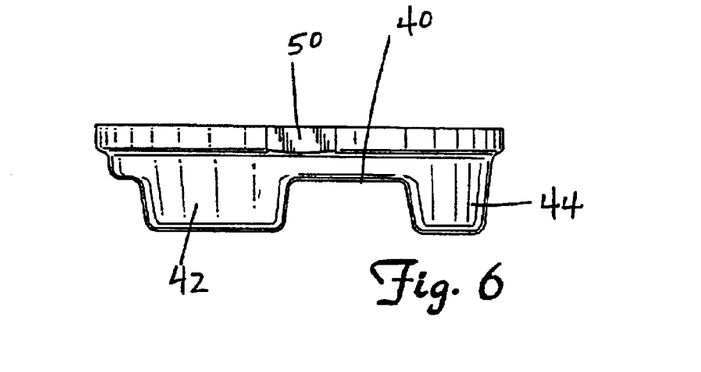
FIG. 6 is a rear view of the livestock feed supplement base of FIG. 1.
Figure 7:
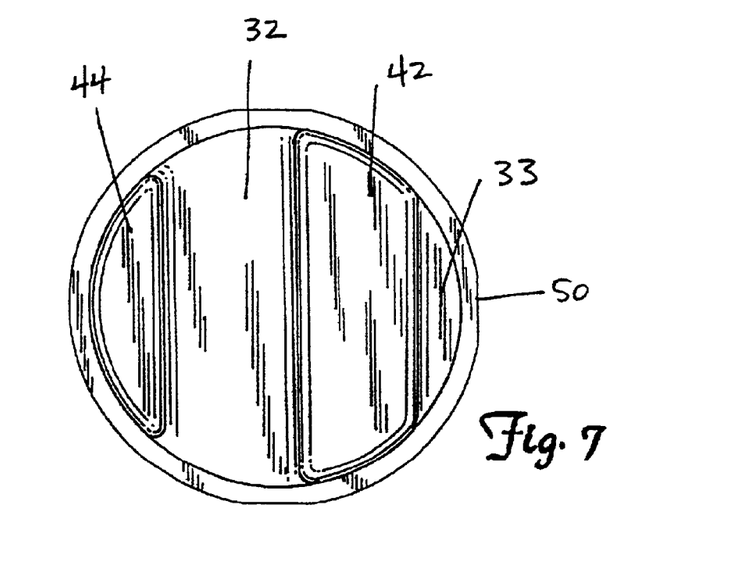
FIG. 7 is a bottom view of the livestock feed supplement base of FIG. 1.
Figure 8:
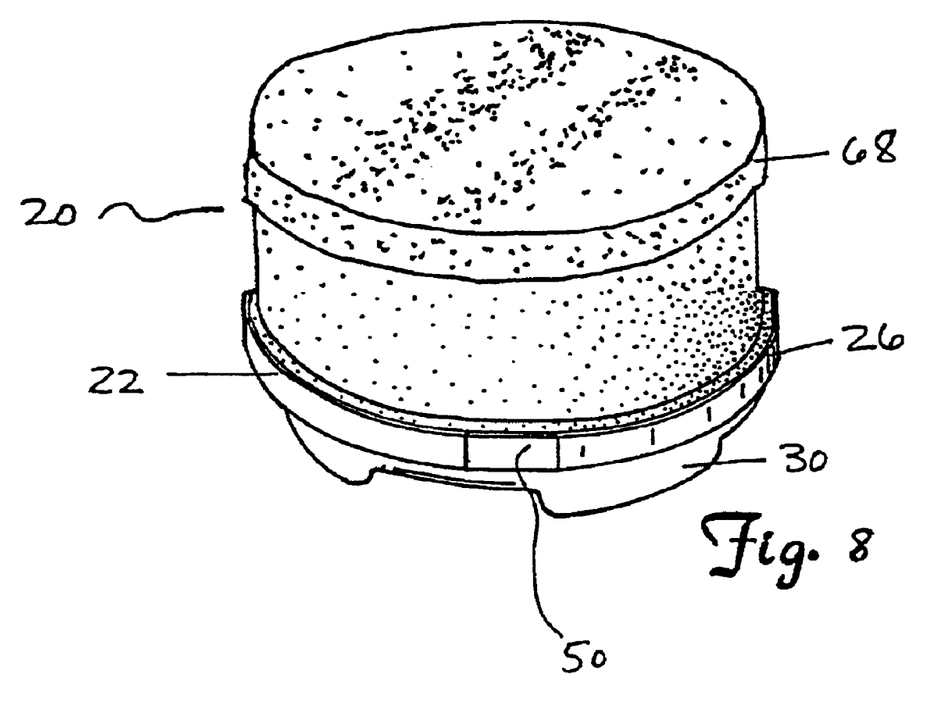
FIG. 8 is a perspective view of a preferred embodiment of the livestock feed supplement block of the present invention.

In a particularly preferred embodiment shown in FIGS. 1 and 2, a plurality of pins 34 are located at intervals along the annular shelf 28. The pins 34 extend upwardly from the shelf surface and can be provided in any suitable dimensions (e.g., height and diameter). Preferably the height of the pins 34 is less than the height of the cylindrical wall 26. Thus, the molded base is configured such that the upper end of the cylindrical wall 26 extends above the pins 34. The pins 34 are adapted to provide additional mechanical attachment of a feed supplement composition to the molded base 22. For example, when feed supplement is provided in the molded base 22, the feed supplement composition can capture and embed the pins 34, thereby anchoring the block to the base.

Optionally, the feed supplement block of the present invention can be used in connection with an exterior casing material. Such exterior casing may provide desired characteristics such as a waterproof surface to protect the feed supplement block, as well as a surface for labeling the feed block and/or identifying the contents of the feed supplement composition. Examples of suitable exterior casing materials include plastic, biopolymer films, and cardboard (preferably noncorrugated). In this embodiment, the pins 34 provide a circumference around which the exterior casing can be placed prior to molding of the block. Thus, the casing material would be provided along the annular shelf 28, between the pins 34 and the generally cylindrical wall 26. Preferably, the pins 34 are provided at a position proximate to the interior edge of the annular shelf, such that the exterior casing can be inserted between the pins 34 and the wall 26, at a position where the pins will be embedded within the feed supplement composition contained within the base 22.

In one embodiment, the exterior casing can be adapted to provide a surface for labeling of the feed block. For example, the exterior casing can provide information regarding the ingredients and product name to the user. In addition, the base can be provided with a label indicating the product name. Therefore, once the user has stripped the exterior casing from the present invention, he or she can compare the stripped casing with the product name on the base 22. This allows the user to determine the ingredients of each feed block, with reference to the exterior casing.

Preferably, each individual feed supplement block of the present invention is provided with an exterior mesh wrapping (encapsulating both the feed supplement composition 24 and the base 22) to protect the feed block during handling after the block has been compressed. In use, the mesh wrapping is placed over the feed supplement composition and extends over the exterior of the base 22, to a position just below the annular shelf 28 of the base. Suitable materials for fabricating the mesh wrapping include plastic or biodegradable materials. The mesh material provides an air permeable layer of protection for the feed block, thereby facilitating curing of the feed supplement composition after it has been compressed into the base. At the same time, the mesh wrapping provides a layer of protection for the feed supplement composition, to reduce chipping of the feed supplement composition after it has been compressed and before it has sufficiently cured.

Figure 10:
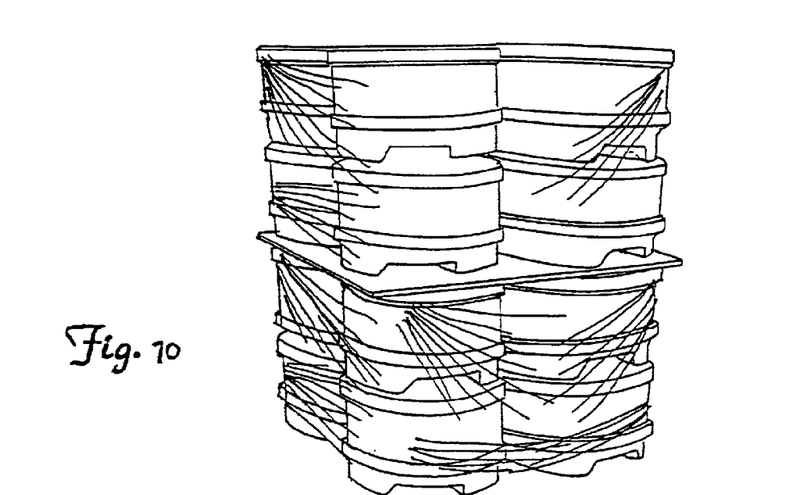
FIG. 10 is a perspective view of a plurality of livestock feed supplement blocks of the present invention, showing groups of eight livestock feed blocks wrapped with an exterior wrapping in the form of a stretch wrapping.

In a particularly preferred embodiment, the feed supplement block of the present invention is provided with an exterior stretch wrapping (encapsulating both the feed supplement composition 24 and the base 22) to protect the block from moisture as well as to contain any loose particles of the feed supplement composition that may be chipped loose during transportation and handling. The stretch wrap is preferably approximately 1–5 mils thick, most preferably approximately 4–5 mils thick. In use, the stretch wrapping is placed over the feed supplement composition and extends over the exterior of the base 22, to a position just below the annular shelf 28 of the base 22. Additionally, as shown in FIG. 10, clusters of eight feed blocks can be stretch wrapped together, to provide a forkliftable unit. As shown in the figure, the feed blocks are commonly provided in two groups of four, with the second group of four being stacked on top of the first group. The entire group of eight is then wrapped as a unit. This exterior stretch wrapping can also provide a labeling surface as described above. As one of skill in the art would readily appreciate, the exterior casing, stretch wrapping and mesh wrapping can be provided individually, or in any combination.

One advantage of the present invention is the ability to secure a plurality of feed blocks 20 to each other for more efficient transportation and handling. Attachment of the feed blocks to each other can be achieved in any suitable fashion. For example, conventional strapping may be placed around the feed blocks to hold them together in the desired spacing. Alternatively, feed blocks can be attached to one another using exterior stretch wrapping as described above. Generally, it is preferred that an even number of feed blocks be attached to each other, forming pairs of feed supplement blocks. In a particularly preferred embodiment, the feed blocks are attached in groups of four or groups of eight.

To assist in securing the feed blocks in groups, a preferred embodiment of the molded base 22 contains a cylindrical wall having interval flattened portions 50. In this embodiment, the cylindrical wall 26 of the base 22 is not rounded about its entire circumference, but rather contains portions spaced around its circumference that are substantially flat. These flattened portions 50 allow feed blocks of the present invention to be placed more closely together and increase the stability of a group of feed blocks. In use, the flattened portions 50 allow the feed blocks 20 to be placed in direct abutment to each other, slightly reducing the size of a group of blocks for ease of transportation.

In a particularly preferred embodiment, when the feed blocks are provided in groups of four, the wall 26 includes at least two, and preferably three spaced apart flattened portions 50. The flattened portions 50 of each feed block thus directly contact a flattened portion of another feed block. The fourth face of the cylindrical wall thus faces the exterior of the feed block group. However, it is to be understood that the present invention is not limited to the use of three flattened portions per feed block. Rather, the number of flattened portions can be adjusted depending upon the number of feed blocks to be transported in a group. For example, if the feed blocks are to be provided in pairs during transportation, only one flattened portion will be required. On the other hand, each base 22 can also contain four flattened portions.

The flattened portions 50 along the wall 26 also provide improved stability of the feed block groups themselves. Generally, when rounded cylindrical walls are placed in direct abutment, the walls have a tendency to slip along their length with respect to one another. However, the flattened portion of the present invention provides a surface for frictional contact between adjacent blocks, reducing the ability of the feed blocks to slip with respect to each other. As a result, the feed blocks of the present invention provide a more stable transportable unit.

The present invention contemplates a livestock feed supplement composition 24 that is compressed into the base 22 described above. The livestock feed supplement composition generally contains required vitamins, minerals and other nutrients for the livestock. Preferably, the livestock feed supplement composition consists of dried grains, selected nutritional supplements and a moisture laden component such as condensed distillers solubles, corn steep liquor, or the like. In a particularly preferred embodiment, the livestock feed supplement composition includes from about 25% to about 65% (by weight) of dried grains; from about 5% to about 45% (by weight) of a premixed base of selected nutritional supplements; and from about 20% to about 45% (by weight) of condensed distillers solubles. In this embodiment, the mixture has a moisture content selected to give a highly palatable urea-free mixture having a granular, formable consistency with a total moisture content of about 18% to about 30%. Preferably, the dried grains are provided in the form of fermented dried grains, and more preferably in the form of fermented distiller's solubles. Optionally, the livestock feed supplement composition can be provided in the form of fermented moist grains which comprise about 50% to about 70% (by weight) of the product, the moisture content of which is about 20% to about 40%, and a premixed base of selected nutritional supplements.

As discussed herein, the granular, formable consistency of the livestock feed supplement composition 24 allows the composition to be molded into a block that is contained in the base 22. That is, the composition of the present invention provides an important aspect of the feed supplement block, as it allows the feed supplement 24 to be compressed into a desired shape and to retain that shape during use. The present invention thus contemplates a feed supplement composition that provides superior hardness and shape retention. Moreover, the present feed supplement composition, when cured, retains sufficient hardness in a wide range of temperatures. For example, the present invention retains rigidity in elevated temperatures, unlike feed supplement compositions that contain molasses that have a tendency to "melt" at such temperatures. Further, the present invention does not become overly hard in colder temperatures and thus avoids the situation where livestock would be unable to consume the feed supplement block. As a result of its rigidity and versatility in a wide range of temperatures, the feed supplement does not require external container walls.

As noted above, the present invention also contemplates a method of preparing a feed supplement block. According to this method, a base is provided (e.g., the molded base 22 illustrated in FIGS. 1–10), and a mold 60 is provided that is defined by a generally cylindrical wall having a bottom edge. The user aligns the base 22 with the bottom edge of the mold 60, forming an interior cavity defined by the cylindrical walls of the mold 60. Once the base and bottom edge of the mold wall are aligned, a flowable (e.g., preferably granular) livestock feed supplement composition is introduced into the mold. The livestock feed supplement composition is then compressed within the mold to form a feed supplement block. After compression, the feed supplement block is removed from the mold and, if needed, suitably cured.

Figure 9:
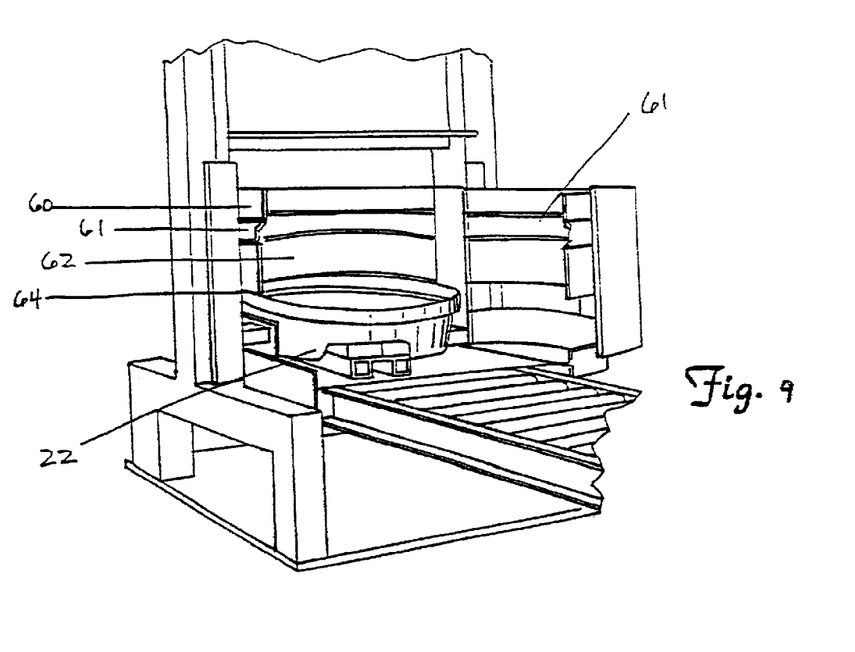
FIG. 9 is a perspective view of the mold shown in FIG. 8, showing one embodiment of the mold apparatus.

As shown in FIG. 9, the method of the present invention contemplates the use of a mold 60 that is upwardly and downwardly open. The mold 60 thus has no top or bottom, but rather consists simply of a generally cylindrical wall 62 having a bottom edge 64. The cylindrical wall 62 defines a cavity that is capable of containing a material such as, for example, a feed supplement composition. The mold 60 can be fabricated from any suitable material, for example, metal or plastic.

In a particularly preferred embodiment, as shown in FIG. 9, the mold 60 is of the clamshell type, having two portions that preferably are substantially mirror images of each other. Thus, when closed, the mold 60 defines the cavity into which the feed supplement material is introduced. One of ordinary skill in the art would understand that the mold 60 can be provided in a variety of shapes and configurations, depending upon the application, and these variations are considered within the scope of the present invention as well. In another embodiment, for example, the mold 60 is provided in three pieces, such that the door of the mold opens in two halves. Although the mold 60 is depicted in the figures as being provided in a particular shape, it is understood that the mold can be provided in a variety of shapes, depending upon the application.

Preferably, the mold 60 includes at least one circumferential ridge 61 that extends generally radially outwardly from the wall of the mold. Thus, the mold 60 forms a feed supplement block that contains a corresponding ridge 68. The ridge 68 creates a balancing rail that can be used when rolling the feed block to the site of use. As described in more detail below, the ridge 68 projects from the side of the feed supplement composition 24 a sufficient distance to match the outer diameter of the base 22, thus allowing the feed block to roll generally straight.

In use, the bottom edge 64 of the mold wall 62 is aligned adjacent the base 22. The mold 60 and base 22 must be aligned such that when the feed supplement is introduced into the cavity of the mold 60, it is contained therein and permitted to accumulate to form the feed block. Once the mold 60 and base 22 are properly aligned, a flowable granular livestock feed supplement composition is introduced into the cavity of the mold 60. As it is poured, feed supplement composition 24 fills the cavity. In a particularly preferred embodiment, approximately 20 gallons of feed supplement composition (or about 2.5 cubic feet), is introduced into the mold. Once a sufficient amount of feed supplement composition is contained within the mold 60, the mold is ready to be compressed to form a solid feed block.

The amount of feed supplement composition 24 provided in the molded base 22 can be adjusted, depending upon the number, type, size and dietary needs of livestock being provided with the supplement. However, the height of the feed supplement composition of the final product is preferably at least approximately twice the height of the molded base 22.

The livestock feed supplement composition 24 is compressed within the mold 60 to form a feed supplement block. The compression forces applied at this stage can be adapted depending upon the particular composition of the feed supplement. In a particularly preferred embodiment, the mold can be provided with an upper half and lower half, wherein the upper half is capable of "floating" relative to the lower half. In this embodiment, the upper half of the mold is permitted to move independently of the lower half, to allow for movement to compensate for the compression forces applied during the method of the invention. Suitable compression forces provide a solid feed supplement block that is durable (e.g., not readily chipped or broken apart), easily transportable, capable of retaining stable shape, and of sufficient hardness. The compressed feed supplement block is then removed from the mold 60. When the mold 60 is provided in the form of a clam-shell having two halves, the mold is opened by separating the halves from the feed supplement block. This provides a compressed feed supplement block contained within a base 22. Generally, the feed supplement is compressed to provide a final total height between about 15 and about 30 total inches, and more preferably between about 18 and about 20 total inches. Thus, the resulting livestock feed supplement block 20 has a weight of approximately 250 pounds, and a total height from ground of between about 15 and about 30 inches, and a diameter of between about 20 inches and about 36 inches.

Optionally, the method of the present invention includes the further step of curing the compressed feed supplement block under suitable conditions (e.g., temperature and duration) to permit the feed supplement to achieve a desired hardness. In a particularly preferred embodiment, the feed block is permitted to cure at least overnight, at a temperature from about room temperature to about 115° F., and more preferably at a temperature from about 85° to about 110° F. In a preferred embodiment, the process of compressing the feed supplement composition generates some heat, allowing the curing process to begin even at room temperature. Generally, the curing process is a moderately exothermic reaction. However, curing at room temperature generally takes a longer period of time than incubating the feed supplement composition at higher temperatures. Additionally, vigorous mixing and/or kneading of the feed supplement prior to introduction into the mold 60 and compression allows the curing step to proceed more quickly.

Optionally, the mold 60 may be lined with an exterior casing material or mesh wrapping prior to being positioned adjacent the molded base 22. In yet another embodiment, the exterior casing material or mesh wrapping is introduced into the base after molded base 22 is in the mold. Suitable exterior casing materials provide an additional surface for protection of the feed block from undesired elements, such as, for example, water. Suitable exterior casing materials and mesh wrapping are described above. It is to be understood that the use of such exterior casing material and/or mesh wrapping is not necessary to the present invention, and that the feed block can be provided without such wrapping.

As discussed in detail above, in yet another aspect, the present invention provides a method of transporting and distributing the livestock feed supplement composition. According to this method, a plurality of livestock feed supplement blocks 20, such as those described above, are provided and at least two feed blocks are attached to one another in a side-by-side abutting relationship. This is desirably done with the first arcuate sections 42 of adjacent feed blocks being disposed toward one another to properly position the channels 32 for receiving the forks of a forklift. The attached feed blocks may then be transported to a position adjacent their desired final location by means of a forklift, whereupon they may be set down on the ground and detached from one another. One or more of the feed blocks so transported may then be moved to its final desired position by tipping it over so that it lays on its side and then rolling the feed block to the desired location before turning it upright again. In both tipping over the feed block turning it upright again, it is preferred that the feed block be tipped adjacent a notch 40 so that it will pivot about the chord C defined by the channel. Alternatively, the feed block can be tipped over at a position adjacent the second channel 33 so that it will pivot about the ledge formed by the channel.

Individual feed blocks can be transported and distributed using the second channel 33 within the floor 30. In this embodiment, the individual feed block can be transported using a hand dolly commonly used in feed mills. The second channel 33 is adapted to receive a fork of a standard hand dolly. The individual feed block may then be transported to a position adjacent its final location, whereupon it may be set down on the ground.

Although the present invention has been described in detail, the foregoing description is illustrative of the present invention but not considered to be limiting. Numerous variations and modifications may be effected without departing from the true scope and spirit of the invention, all of which are contemplated as falling within the scope of the appended claims.

What is claimed is:

1. A method of preparing a livestock feed supplement block comprising the steps of:
   a) providing a molded base, including:
      (i) a generally cylindrical wall having upper and lower ends,
      (ii) a generally circular floor that is integrally formed with the wall to define an upwardly open interior cavity;
   b) providing a mold that is upwardly and downwardly open, the mold being defined by a generally cylindrical wall having a bottom edge;
   c) aligning the molded base adjacent the bottom edge of the cylindrical mold wall;
   d) pouring a flowable granular livestock feed supplement composition into the mold
   e) compressing the livestock feed supplement composition within the mold and into the base to form a feed supplement block; and f) removing the compressed feed supplement block, including its base, from the mold.

2. The method of claim 1 further comprising the step of providing an exterior mesh wrapping material within the mold.

3. The method of claim 2 wherein the exterior mesh wrapping material is selected from the group consisting of plastic and biodegradable wrapping.

4. The method of claim 2 wherein the exterior casing material is selected from the group consisting of plastic, biopolymer films, and cardboard.

5. The method of claim 1 further comprising the step of providing an exterior casing material within the mold.

6. The method of claim 1 wherein the livestock feed supplement composition consists essentially of:

(i) from about 25% to about 65% by weight of dried gains;

(ii) from about 5% to about 45% by weight of a premixed base of selected nutritional supplements; and (iii) from about 20% to about 45% by weight of condensed distillers solubles, having a moisture content selected to give a highly palatable urea-free mixture of granular, formable consistency having total moisture content of about 18–30%.

7. The method of claim 1 wherein the mold is provided as a two-piece assembly.

8. The method of claim 1 further comprising the step of allowing the livestock feed supplement block to cure.

9. The method of claim 1 wherein the generally circular floor of the molded base is configured and arranged to define a downwardly open channel, wherein the opposite ends of the channel are defined by a pair of downwardly open notches in the wall, the channel having a center line disposed away from the center of the generally circular floor.

* * * * *